United States Patent
Amador et al.

(10) Patent No.: US 9,264,427 B2
(45) Date of Patent: Feb. 16, 2016

(54) METHOD AND SYSTEM FOR TRANSFERRING A DESIGNATED CALL TO A CELLULAR TELEPHONE

(75) Inventors: Erick Simon Amador, Miramar, FL (US); Gregory Jensen Boss, American Fork, UT (US); Rick Allen Hamilton, Charlottesville, VA (US); Timothy Moffett Waters, Hiram, GA (US)

(73) Assignee: International Business Machines Corporation, Armonk, NY (US)

( * ) Notice: Subject to any disclaimer, the term of this patent is extended or adjusted under 35 U.S.C. 154(b) by 360 days.

(21) Appl. No.: 11/553,175

(22) Filed: Oct. 26, 2006

(65) Prior Publication Data
US 2008/0102746 A1 May 1, 2008

(51) Int. Cl.
H04L 29/06 (2006.01)
H04M 3/38 (2006.01)
H04M 3/42 (2006.01)
H04M 7/12 (2006.01)
H04M 3/46 (2006.01)
H04M 3/54 (2006.01)

(52) U.S. Cl.
CPC ........... *H04L 63/0861* (2013.01); *H04M 3/385* (2013.01); *H04M 3/42153* (2013.01); *H04M 7/1235* (2013.01); *H04M 3/46* (2013.01); *H04M 3/54* (2013.01)

(58) Field of Classification Search
CPC .. H04M 3/541; H04M 3/543; H04M 3/42272
USPC ........................... 455/417, 406; 379/161–194
See application file for complete search history.

(56) References Cited

U.S. PATENT DOCUMENTS

| | | | |
|---|---|---|---|
| 5,473,671 A * | 12/1995 | Partridge, III | 455/445 |
| 5,966,653 A * | 10/1999 | Joensuu et al. | 455/445 |
| 6,246,751 B1 * | 6/2001 | Bergl et al. | 379/67.1 |
| 6,418,324 B1 | 7/2002 | Doviak et al. | |
| 6,804,532 B1 | 10/2004 | Moon et al. | |
| 7,046,961 B2 | 5/2006 | Park | |
| 7,123,700 B1 * | 10/2006 | Weaver et al. | 379/88.19 |
| 2002/0146105 A1 * | 10/2002 | McIntyre | 379/211.02 |
| 2003/0117316 A1 | 6/2003 | Tischer | |
| 2005/0286690 A1 | 12/2005 | Thommana et al. | |
| 2006/0057961 A1 | 3/2006 | Dietz et al. | |

OTHER PUBLICATIONS

"The Cell Phone Versus the Landline" by Tia Jackson, Nov. 29, 2005 available at http://ezinearticles.com/?The-Cell-Phone-Versus-The-Landline&id=104411.*
Overview of the UMA Technology. [online]. 2 pages. Copyright 2004-2005. Retrieved form the Internet:< URL: http://www.umatechnology.org/overview/index.htm>.

* cited by examiner

*Primary Examiner* — Rafael Pérez-Gutiérrez
*Assistant Examiner* — Joshua Schwartz
(74) *Attorney, Agent, or Firm* — Schmeiser, Olsen & Watts, LLP; Mark C. Vallone

(57) ABSTRACT

The present invention is a method and system of transferring any telephone call designated to a first user to the cellular telephone of a second user. The system authenticates an end user's biometric information and then allows the end user to answer an incoming landline telephone call from any location using a cellular phone. Additionally, the reverse situation is true. An authenticated end user can answer an incoming cellular telephone call from any location using an available landline telephone.

15 Claims, 4 Drawing Sheets

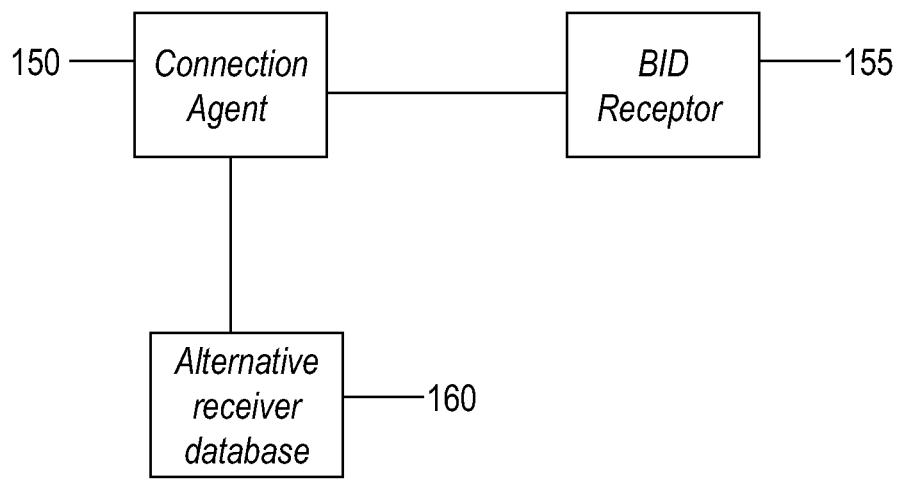
Figure 2A (Detail breakdown
For phone unit 100 &130)
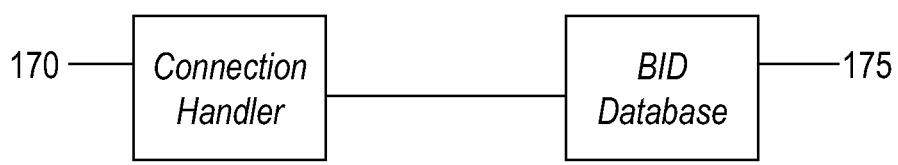
Figure 2B (Detail breakdown
For phone unit 120 &140)

METHOD AND SYSTEM FOR TRANSFERRING A DESIGNATED CALL TO A CELLULAR TELEPHONE

FIELD OF INVENTION

The present invention relates to the field of cellular communications. More specifically, the present invention relates to a technique for transferring any incoming telephone call for a first user to the cellular telephone of a second user.

BACKGROUND

In today's culture millions of people rely on cellular phones on a daily basis. Cellular phones are used to store contact information, make to do lists, send/receive e-mail, get information from the Internet, play games, and use calculator. Methods exist for the integration of cellular telephones with other communication devices such as laptops, GPS devices, and PDA's. However, currently there is a need for a comprehensive system that integrates cellular phones with home and/or office landlines. A system and method that automatically transfers any incoming telephone call to another authenticated cellular telephone is desired to provide cost-effective service and rates for long distance calling plans for cellular telephones.

SUMMARY OF THE INVENTION

The present invention is a method and system of transferring any telephone call designated to a first user to the cellular telephone of a second user. In the system, each cellular and landline telephone in the telecommunication network is adapted with a biometric authentication unit. Additionally, each cellular and landlines telephone in the telecommunication network is assigned two unique identification numbers, a biometric identifier and a unique numeric telephone number. The system authenticates the end user biometric information and then allows the end user to answer an incoming landline telephone call from any location using a cellular phone as an alternate receiver. Additionally, the reverse situation is true. An authenticated end user can answer an incoming cellular telephone call from any location using an available landline telephone as an alternate receiver.

One objective of the present invention is to provide a system and method of integrating cellular telephone and home/office telephone lines.

Another objective of the present invention is to provide a secure and seamless method of authenticating an end user.

BRIEF DESCRIPTION OF THE DRAWINGS

A more detailed understanding of the present invention can be obtained from the following description in conjunction with the accompanying drawings wherein:

FIG. 2A illustrates a block diagram of an overview of how the present invention integrates into the current cellular and land line phone unit utilized in the telecommunication network.

FIG. 2B illustrates a block diagram of an overview of how the present invention integrates the central office of the current telecommunications network.

DETAILED DESCRIPTION OF THE INVENTION

Figure 1:
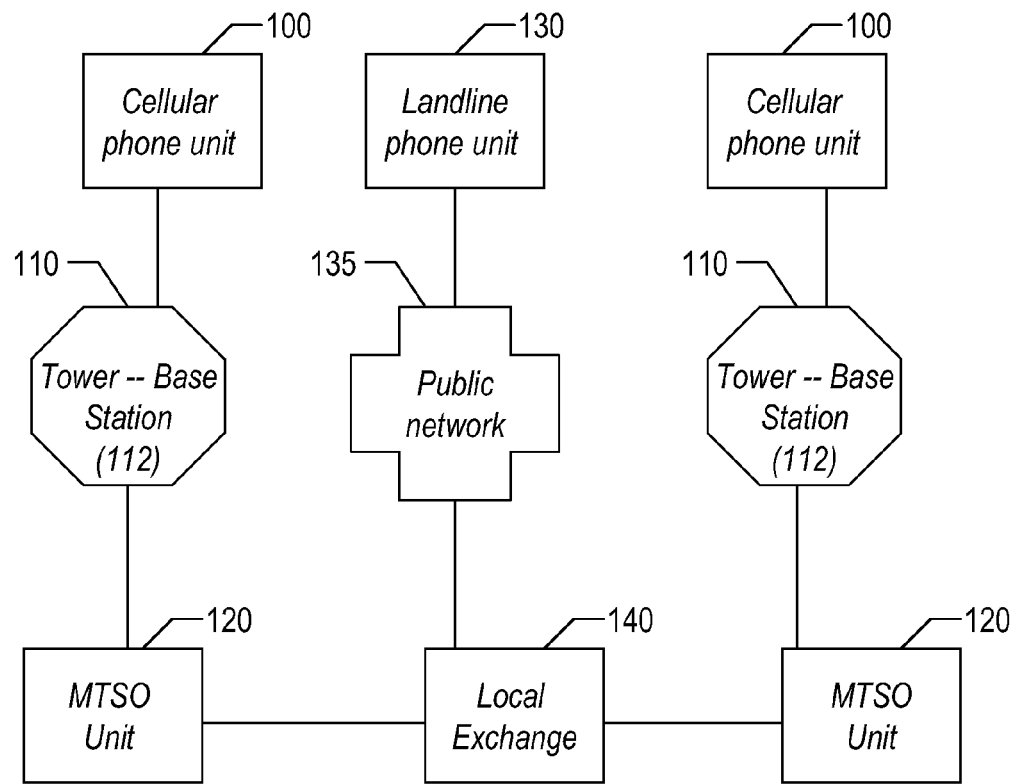
FIG. 1 illustrates a block diagram of an overview of the cellular telephone system connected to the public telephone network.

Referring to FIG. 1, there is shown a block diagram of an overall configuration of the current telecommunication network in use today. Each cellular phone unit (100) operates within a particular cell (110), and as a cellular phone user (100) travels, cellular phone (100) switches between cells (110). As shown, a specific carrier segments a city into a plurality of cells (100). Each cell (110) can typically be approximately ten square miles. Each cell consists of base station (112) having a tower along with a small building containing radio equipment. Using radio signals, cellular phone units (100) communicate with a specific cell tower (113) that cover a certain range. Each cell tower has a certain range in which it can receive radio signals. The range of each cell tower overlaps with another cell tower such that as the cellular phone unit (100) user travels the communication is uninterrupted. However, to communicate with a user on the wired public telephone network (135), the cellular phone unit (100) radio signals are routed from the cell tower (113) to a mobile switching center (MTSO) (120) which in turn routes the signal onto the wired public telephone network (135) through a local exchange (140) connected to the MTSO (120). Each carrier in each city runs one central office MTSO (120) that control all base stations (112) within a city and the connection to the local exchange (140).

Referring to FIG. 2A and FIG. 2B, there is shown a block diagram of the present invention incorporated into the current telecommunication network. The system of the present invention further includes a connection handler unit (170), connection agent (150), biometric identification (BID) database (175), BID receptor (155), and alternate receiver database (160). The connection handler unit (170), located within the MTSO (120) and the local exchange (140), handles the connection between the originating call and the final connection to an alternate receiver of the incoming call. The connection agent (150) is the software module within the cellular phone (100) and the landline phone (130) that communicates with connection handler unit (170) to complete the call connection. The BID receptor (155) and the alternate receiver database (160) are each within the cellular phone (100) and the landline phone (130).

The present invention is adapted with seamless wireless biometric authentication functionality. BID database (175), located within the MTSO (120) and the local exchange (140), contain a table of the authenticated biometric information for each registered cellular phone (100) and landline phone (130). The biometric information determines who is authorized to use a specific cellular phone unit (100) or landline phone (130).

BID receptor unit (155) reads the biometric information from the user, digitizes the biometric information, stores the biometric information and can perform a comparison function between the stored biometric information and the end user inputted biometric information. Additionally, the BID receptor unit (155) can be a scanner or another suitable input mechanism. The biometric information can be a user's unique features such as fingerprint, voice print, retina of eye or another suitable feature.

Currently, each cellular phone unit (100) has three identification codes:

Electronic Serial Number (EIN) which is the unique number programmed into the phone when it is manufactured; a permanent part of the phone Mobile Identification number (MIN) is the unique number derived from the assigned mobile telephone number System Identification Code (SID) is a unique 5 digit number that is assigned to each carrier by the FCC; both the MIN and SID are programmed upon activation of the code The present invention further comprises a Biometric Identification Code (BID) that is also programmed into each cellular phone (100) and landline phone (130) upon activation. The registration process of the BID will be described below in further detail.

Figure 3:
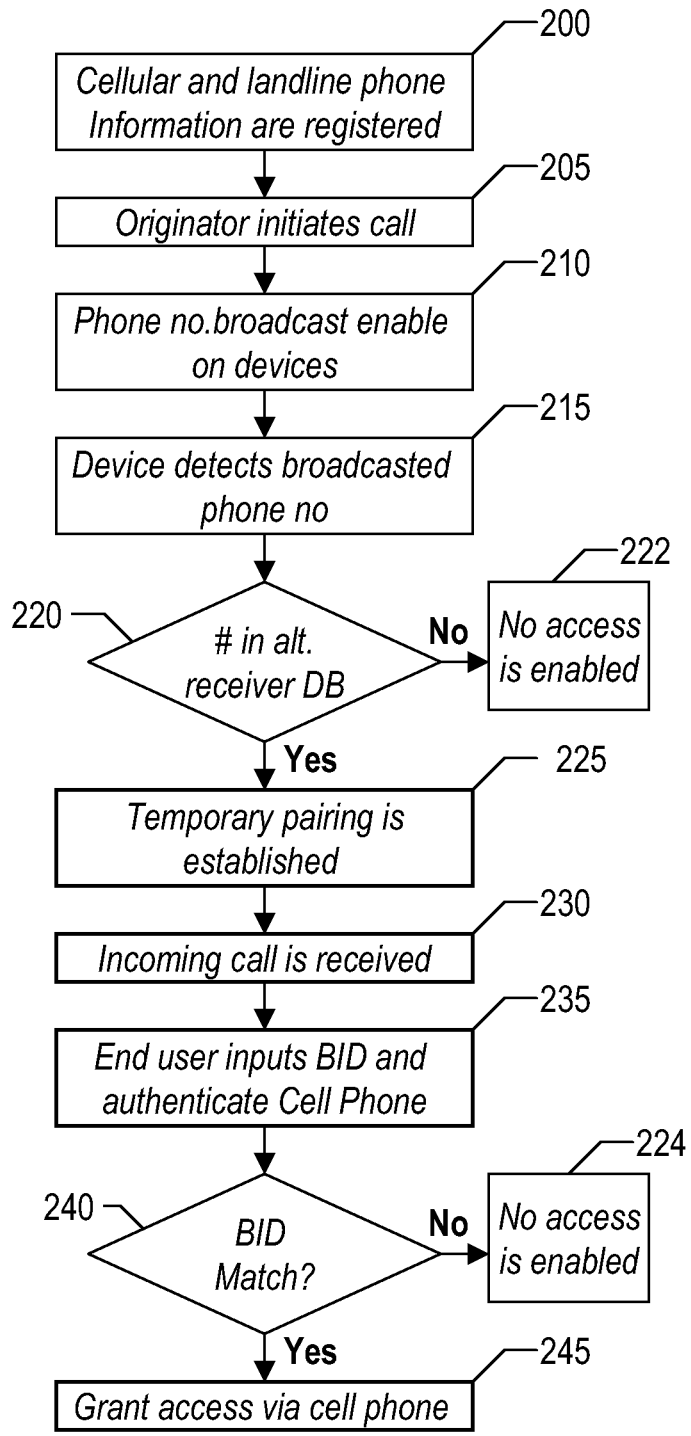
FIG. 3 illustrates a flow chart of process of how an incoming call is forwarded from a landline phone to a cell phone.

Referring to FIG. 3, there is shown a flow chart of the process of transferring an incoming phone call designated for a landline phone unit to an alternate cellular telephone receiver. Currently, call forwarding is setup to a specific biometric phone line without any biometric authentication process. The present invention allows an incoming call to be forwarded to any available authenticated alternate telephone receiver.

In step 200, each landline phone and each cell phone is registered with their respective control office. Upon activation, each landline phone and/or each cell phone is assigned a unique phone number and biometric identification number. Each landline phone is registered with their local exchange office, and each cell phone is registered with their MTSO. During this registration process, each telephone's unique identification information is stored in the BID database on the telephone network. Additionally, each subscribed cellular phone user and each subscribed landline telephone user must enter into their alternate receiver database the allowed possible alternate receivers.

Call processing for a telephone connection starts with an idle phone and ends with the disconnection of all participating parties involved in the telephone call. In step 205, when a cellular phone is first powered on, it listens for the SID on the control channel, a special frequency used for communication between the cell phone and the base station. When the phone receives the SID, the phone compares the programmed SID with the received SID. If the SID's match, the cellular phone knows that it is communicating with its verified carrier home system. Along with the SID, the cell phone also transmits a registration request with a MTSO. The registration request can also contain the BID information. At this point, the MTSO can authenticate the cellular phone via its BID. After authentication, the MTSO keeps track of the cellular phone location in a database so that it can find the cellular phone to complete a connection. Additionally, each landline phone unit is wired to the local exchange so that the registration process is automatic. The connection handler unit of the MTSO and the connection agent of the cellular phone communicate to establish registration with the MTSO.

After registration, the cellular phone unit is returned a dial tone by the connection handler unit of the MTSO. Then, the originating user inputs the receiving party landline telephone number. Once the receiving party landline telephone is located and call forwarding is enabled, the landline phone connection agent provides to the local exchange the possible receivers from the local alternate receiver database. The local exchange communicates with the MTSO unit of the list of enabled alternate cell phone receivers.

At step 210, the receiving land line phone number is broadcasted onto the network to the enabled alternate cellular phone receivers. At step 215, an alternate cell phone receiver receives the broadcasted phone number. Then, at step 220, the connection agent of the detected device proceeds to determine if the broadcasted phone number is in its alternate receiver database. If the broadcasted phone number is not in the alternate database, the system proceeds to step 222 in which no access to this particular alternate receiver is allowed. If the broadcasted phone number is in its local alternate database, the system proceeds to step 225. At step 225, a temporary pairing connection is made between the originating user and the alternate cellular phone receiver. At step 230, the incoming call is connected to the end user's alternate receiver.

At step 235, the end user inputs his biometric information for authentication via the phone biometric receptor. Then, the connection agent of the cellular phone transmits the end user BID information to the MTSO. The biometric information is then transmitted by the MTSO to the local exchange of the landline phone for verification. At step 240, the connection handler unit of the local exchange compares the transmitted biometric information with the end user stored biometric information. If the transmitted biometric information does not match the stored biometric information, the system proceeds to step 224 and access is denied. However, if the transmitted biometric information does match the stored biometric information, the system proceeds to step 245 allowing communication to proceed on the cell phone.

Figure 4:
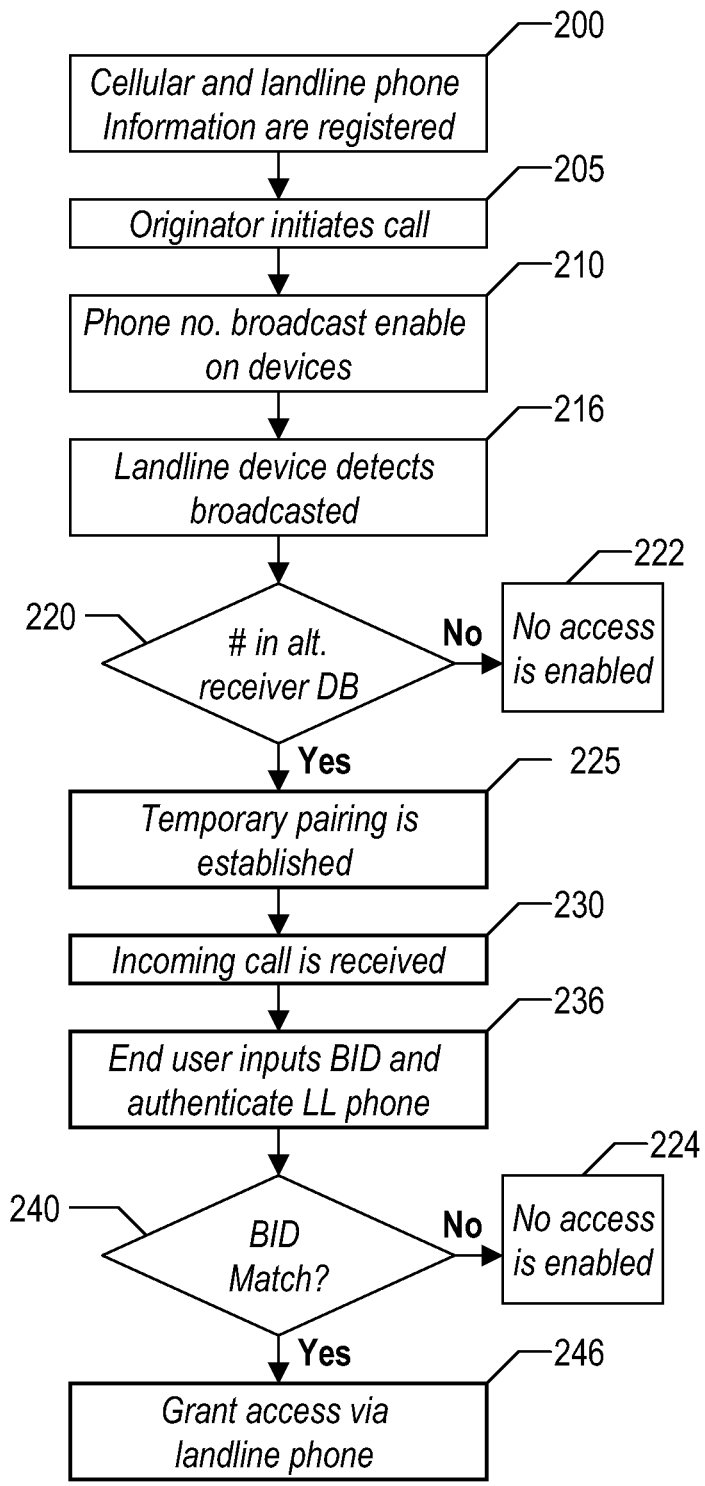
FIG. 4 illustrates a flow chart of process of how an incoming call is forwarded from a cellular phone to a landline phone.

Referring to FIG. 4, the system could work in the reverse. With this scenario, the incoming cell phone is transferred to a landline telephone alternate receiver. However, the process is similar. Then, the originating user inputs the receiving party cellular telephone number. Once the end user's receiving party cellular telephone is located and call forwarding is enabled, the cellular phone connection agent provides to the MTSO the possible alternate land line telephone receivers from the alternate receiver database. The MTSO unit communicates to the local exchange the list of enabled alternate landline phone receivers.

At step 210, the receiving phone number is broadcasted onto the telephone network to the enabled alternate landline phone receivers. At step 215, an alternate landline phone receiver receives the broadcasted phone number. Then, at step 220, the connection agent of the detected device proceeds to determine if the broadcasted phone number is in its local alternate receiver database. If the broadcasted phone number is not in the local alternate database, the system proceeds to step 222 in which no access to this particular alternate receiver is allowed. If the broadcasted phone number is in the alternate database, the system proceeds to step 225. At step 225, a temporary pairing connection is made between the originating user and the end user's landline alternate receiver. At step 230, the incoming call is connected with the end user's alternate receiver.

At step 235, the end user inputs his biometric information into the landline telephone BID receptor. The land line phone connection agent transmits the end user's captured BID to the local exchange. For verification, the biometric information is then transmitted by the local exchange of the landline phone to the MTSO controlling the alternate cellular receiver. At step 240, the connection handler unit of the MTSO compares the transmitted biometric information with the end user stored biometric information. If the transmitted biometric information does not match the stored biometric information, the system proceeds to step 224 and access is denied. However, if the transmitted biometric information does match the stored biometric information, the system proceeds to step 245 allowing communication to proceed on the landline phone.

Prior to use the end user biometric information must be inputted into the system and stored on assigned MTSO or the local telephone exchange. During the registration process, the user would input the biometric information utilizing a biometric receptor unit within a cellular phone or land line phone unit. After the biometric information is captured within the telephone unit, it is interpreted and transmitted to the central for storage in a centrally located database. In the preferred embodiment, the registration process occurs during phone activation. Utilizing the information stored within each specific telephone alternative database, the connection handler within the telephone network can be adapted to locate any alternative receiver located anywhere within the network. After the alternative receiver is located, the end user is authenticated.

The present invention provides a computer program product, comprising a computer readable storage medium storing instructions configured to be executed by a processor of a computer system to implement a method of transferring an incoming telephone call designated for an end user to an alternate phone.

What is claimed is:

1. A method of transferring an incoming telephone call designated for an end user to an alternate phone receiver, said method comprising:
   said alternate phone receiver receiving, from a broadcast of a phone number of a first phone to enabled alternate phone receivers that exist in a first alternate receiver database directly connected to a first connection agent in the first phone, the broadcasted phone number of the first phone, said first alternate receiver database existing in the first phone, said first connection agent being first software in the first phone, said alternate phone receivers that exist in the first alternate receiver database having been identified by the first connection agent, said phone number of the first phone having been previously entered by an originating user for an incoming telephone call to the first phone from the originating user, said alternate phone receiver being one enabled alternate phone receiver of the enabled alternate phone receivers that exit in the first alternate receiver database;
   after said receiving the broadcasted phone number of the first phone, ascertaining, by a second connection agent in a second phone, that the broadcasted phone number of the first phone is in a list of allowed phone numbers in a second alternate receiver database directly connected to the second connection agent, said second alternate receiver database existing in the second phone, said second connection agent being second software in the second phone;
   responsive to said ascertaining, connecting the incoming telephone call from the originating user to the alternate phone receiver;
   receiving transmitted biometric information consisting of biometric information that had been inputted by the end user at the second phone after said connecting; and
   directly responsive to having determined that the transmitted biometric information matches stored biometric information of the end user in a biometric information database located in a mobile switching center, enabling the incoming telephone call to proceed on the second phone.

2. The method of claim 1, wherein the first phone is a land line phone and the second phone is a cellular phone.

3. The method of claim 1, wherein the first phone is a cellular phone and the second phone is a land line phone.

4. The method of claim 1,
   wherein the biometric information database comprises a unique phone number of the alternate phone receiver, a unique biometric identification number of the alternate phone receiver, and the biometric information of the end user.

5. The method of claim 4, said method further comprising:
   authenticating the alternate phone receiver via the unique biometric identification number of the alternate phone receiver.

6. A computer program product, comprising a computer readable storage medium comprising hardware that stores instructions configured to be executed by a processor of a computer system to implement a method of transferring an incoming telephone call designated for an end user to an alternate phone receiver, said method comprising:
   said alternate phone receiver receiving, from a broadcast of a phone number of a first phone to enabled alternate phone receivers that exist in a first alternate receiver database directly connected to a first connection agent in the first phone, the broadcasted phone number of the first phone, said first alternate receiver database existing in the first phone, said first connection agent being first software in the first phone, said alternate phone receivers that exist in the first alternate receiver database having been identified by the first connection agent, said phone number of the first phone having been previously entered by an originating user for an incoming telephone call to the first phone from the originating user, said alternate phone receiver being one enabled alternate phone receiver of the enabled alternate phone receivers that exit in the first alternate receiver database;
   after said receiving the broadcasted phone number of the first phone, ascertaining, by a second connection agent in a second phone, that the broadcasted phone number of the first phone is in a list of allowed phone numbers in a second alternate receiver database directly connected to the second connection agent, said second alternate receiver database existing in the second phone, said second connection agent being second software in the second phone;
   responsive to said ascertaining, connecting the incoming telephone call from the originating user to the alternate phone receiver;
   receiving transmitted biometric information consisting of biometric information that had been inputted by the end user at the second phone after said connecting; and
   directly responsive to having determined that the transmitted biometric information matches stored biometric information of the end user in a biometric information database located in a mobile switching center, enabling the incoming telephone call to proceed on the second phone.

7. The computer program product of claim 6, wherein the first phone is a land line phone and the second phone is a cellular phone.

8. The computer program product of claim 6, wherein the first phone is a cellular phone and the second phone is a land line phone.

9. The computer program product of claim 6,
   wherein the biometric information database comprises a unique phone number of the alternate phone receiver, a unique biometric identification number of the alternate phone receiver, and the biometric information of the end user.

10. The computer program product of claim 9, said method further comprising:
   authenticating the alternate phone receiver via the unique biometric identification number of the alternate phone receiver.

11. A computer system comprising a processor and a computer readable memory unit coupled to the processor, said memory unit containing instructions configured to be executed by the processor to implement a method of transferring an incoming telephone call designated for an end user to an alternate phone receiver, said method comprising:

said alternate phone receiver receiving, from a broadcast of a phone number of a first phone to enabled alternate phone receivers that exist in a first alternate receiver database directly connected to a first connection agent in the first phone, the broadcasted phone number of the first phone, said first alternate receiver database existing in the first phone, said first connection agent being first software in the first phone, said alternate phone receivers that exist in the first alternate receiver database having been identified by the first connection agent, said phone number of the first phone having been previously entered by an originating user for an incoming telephone call to the first phone from the originating user, said alternate phone receiver being one enabled alternate phone receiver of the enabled alternate phone receivers that exit in the first alternate receiver database;

after said receiving the broadcasted phone number of the first phone, ascertaining, by a second connection agent in a second phone, that the broadcasted phone number of the first phone is in a list of allowed phone numbers in a second alternate receiver database directly connected to the second connection agent, said second alternate receiver database existing in the second phone, said second connection agent being second software in the second phone;

responsive to said ascertaining, connecting the incoming telephone call from the originating user to the alternate phone receiver;

receiving transmitted biometric information consisting of biometric information that had been inputted by the end user at the second phone after said connecting; and directly responsive to having determined that the transmitted biometric information matches stored biometric information of the end user in a biometric information database located in a mobile switching center, enabling the incoming telephone call to proceed on the second phone.

12. The computer system of claim 11, wherein the first phone is a land line phone and the second phone is a cellular phone.

13. The computer system of claim 11, wherein the first phone is a cellular phone and the second phone is a land line phone.

14. The computer system of claim 11,
wherein the biometric information database comprises a unique phone number of the alternate phone receiver, a unique biometric identification number of the alternate phone receiver, and the biometric information of the end user.

15. The computer system of claim 14, said method further comprising:
authenticating the alternate phone receiver via the unique biometric identification number of the alternate phone receiver.

* * * * *